(12) United States Patent
Xie

(10) Patent No.: US 12,547,816 B2
(45) Date of Patent: Feb. 10, 2026

(54) DOCUMENT DISPLAY METHOD AND APPARATUS, ELECTRONIC DEVICE, AND STORAGE MEDIUM

(71) Applicant: BEIJING ZITIAO NETWORK TECHNOLOGY CO., LTD., Beijing (CN)

(72) Inventor: Guangping Xie, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 162 days.

(21) Appl. No.: 18/548,425

(22) PCT Filed: Feb. 28, 2022

(86) PCT No.: PCT/CN2022/078213
§ 371 (c)(1),
(2) Date: Aug. 30, 2023

(87) PCT Pub. No.: WO2022/184006
PCT Pub. Date: Sep. 9, 2022

(65) Prior Publication Data
US 2024/0143896 A1    May 2, 2024

(30) Foreign Application Priority Data
Mar. 1, 2021    (CN) .......................... 202110227792.6

(51) Int. Cl.
*G06F 40/106* (2020.01)
*G06F 3/04855* (2022.01)

(52) U.S. Cl.
CPC ........ *G06F 40/106* (2020.01); *G06F 3/04855* (2013.01)

(58) Field of Classification Search
None
See application file for complete search history.

(56) References Cited

U.S. PATENT DOCUMENTS 7,496,829 B2 *  2/2009  Rubin .................. G06F 3/0483
                                                    715/788
9,026,932 B1 *  5/2015  Dixon ................ G06F 3/04883
                                                    715/776
(Continued)

FOREIGN PATENT DOCUMENTS

CN      102855054 A      1/2013
CN      106201390 A     12/2016
(Continued)

OTHER PUBLICATIONS

Office Action for Chinese Patent Application No. 202110227792.6, mailed on Aug. 1, 2024, 18 pages.
(Continued)

*Primary Examiner* — Toan H Vu
(74) *Attorney, Agent, or Firm* — Astute IP Law Group

(57) ABSTRACT

Provided are a document display method and apparatus, an electronic device, and a storage medium. The method comprises: receiving a first browsing instruction in a first page, wherein the first page displays a first window and at least one second window, the first window displays a first document, and the second window displays a second document; and controlling, in response to the first browsing instruction, the second window to move in a preset direction, to adjust document content displayed in a target window area of the first page, wherein the target window area is configured to display all windows other than the first window.

17 Claims, 8 Drawing Sheets

(56) References Cited

U.S. PATENT DOCUMENTS

| | | | | |
|---|---|---|---|---|
| 9,372,859 | B1* | 6/2016 | Maeng | G06F 40/103 |
| 2002/0054121 | A1* | 5/2002 | Seng | G06F 3/0483 |
| | | | | 715/776 |
| 2006/0161860 | A1 | 7/2006 | Holecek et al. | |
| 2009/0144620 | A1* | 6/2009 | Bauchot | G06F 40/103 |
| | | | | 715/277 |
| 2011/0184738 | A1* | 7/2011 | Kalisky | G06F 3/167 |
| | | | | 704/260 |
| 2012/0060089 | A1* | 3/2012 | Heo | G06F 3/04883 |
| | | | | 715/702 |
| 2012/0096376 | A1* | 4/2012 | Hibi | G06F 3/04883 |
| | | | | 715/765 |
| 2013/0021261 | A1* | 1/2013 | Wilson | G06F 15/0291 |
| | | | | 345/1.3 |
| 2013/0241829 | A1* | 9/2013 | Kim | G06F 3/04886 |
| | | | | 345/157 |
| 2014/0331174 | A1 | 11/2014 | Wen et al. | |
| 2015/0212692 | A1* | 7/2015 | Hyun | G06F 3/0488 |
| | | | | 715/719 |
| 2015/0227173 | A1* | 8/2015 | Hwang | G06F 1/1652 |
| | | | | 345/619 |
| 2016/0134839 | A1* | 5/2016 | Inomata | H04L 65/403 |
| | | | | 348/14.09 |
| 2016/0349936 | A1 | 12/2016 | Cho et al. | |
| 2020/0193085 | A1 | 6/2020 | Tanaka | |
| 2020/0356253 | A1 | 11/2020 | Yoshimoto | |

FOREIGN PATENT DOCUMENTS

| | | |
|---|---|---|
| CN | 107977342 A | 5/2018 |
| CN | 108628510 A | 10/2018 |
| CN | 109917980 A | 6/2019 |
| CN | 110471596 A | 11/2019 |
| CN | 110705207 A | 1/2020 |

OTHER PUBLICATIONS

International Search Report and Written Opinion, International Patent Application No. PCT/CN2022/078213, May 9, 2022, with English translation of Search Report (10 pages).

* cited by examiner

DOCUMENT DISPLAY METHOD AND APPARATUS, ELECTRONIC DEVICE, AND STORAGE MEDIUM

This application is the national phase of International Patent Application No. PCT/CN2022/078213 filed on Feb. 28, 2022, which claims priority to Chinese Patent Application No. 202110227792.6, titled "DOCUMENT DISPLAY METHOD AND APPARATUS, ELECTRONIC DEVICE, AND STORAGE MEDIUM", filed on Mar. 1, 2021 with the China National Intellectual Property Administration, both of which are incorporated herein by reference in their entireties.

FIELD

The present disclosure relates to the technical field of online documents, and in particular to a document display method and apparatus, an electronic device and a storage medium.

BACKGROUND

Currently, a user may open multiple documents in a paging mode for browsing, and may switch among documents displayed on a page through a corresponding switching operation when too many documents are opened to be fully displayed on the page.

However, when two documents are kept apart by several documents and the two documents cannot be displayed on the page simultaneously, the user needs to perform the switching operation repeatedly to comparatively view the two documents, which is cumbersome and results in poor user experience.

SUMMARY

A document display method and apparatus, an electronic device, and a storage medium are provided according to embodiments of the present disclosure, to realize comparative viewing of any two or more documents.

In a first aspect, a document display method is provided according to an embodiment of the present disclosure, which includes:
  receiving a first browsing instruction in a first page, where the first page displays a first window and at least one second window, the first window displays a first document, the second window displays a second document; and
  controlling, in response to the first browsing instruction, the second window to move in a preset direction, to adjust document content displayed in a target window area of the first page, where the target window area is configured to display all windows other than the first window.

In a second aspect, a document display apparatus is provided according to an embodiment of the present disclosure, which includes:
  a first instruction receiving module, configured to receive a first browsing instruction in a first page, where the first page displays a first window and at least one second window, the first window displays a first document, the second window displays a second document; and
  a content switching module, configured to control the second window to move in a preset direction in response to the first browsing instruction, to adjust document content displayed in a target window area of the first page, where the target window area is configured to display all windows other than the first window.

In a third aspect, an electronic device is provided according to an embodiment of the present disclosure, which includes:
  one or more processors; and
  a memory, configured to store one or more programs, where
  the one or more programs, when executed by the one or more processors, cause the one or more processors to perform the document display method described in the embodiments of the present disclosure.

In a fourth aspect, a computer-readable storage medium is provided according to an embodiment of the present disclosure, which includes a computer program stored thereon, where the computer program, when executed by a processor, performs the document display method described in the embodiments of the present disclosure.

With the document display method and apparatus, electronic device, and storage medium according to the embodiments of the present disclosure, a first browsing instruction is received in a first page that displays a first window and at least one second window, where the first window displays a first document, and the second window displays a second document, and in response to the first browsing instruction, the second window is controlled to move in a specific direction, to adjust a document content displayed in a target window area in the first page, where the target window area is configured to display all windows other than the first window. With the above technical solution of the embodiment of the present disclosure, the user can browse other documents in the first page while viewing a document by moving only some windows in the first page, which facilitates the user to comparatively view different documents in the first page, thus improving the user experience.

BRIEF DESCRIPTION OF THE DRAWINGS

The above and other features, advantages and aspects of embodiments of the present disclosure will become more apparent in conjunction with the drawings and with reference to the following specific embodiments. Throughout the drawings, identical or similar reference signs indicate identical or similar elements. It should be understood that the drawings are schematic and that the originals and elements are not necessarily drawn to scale.

DETAILED DESCRIPTION OF EMBODIMENTS

Figure 1:
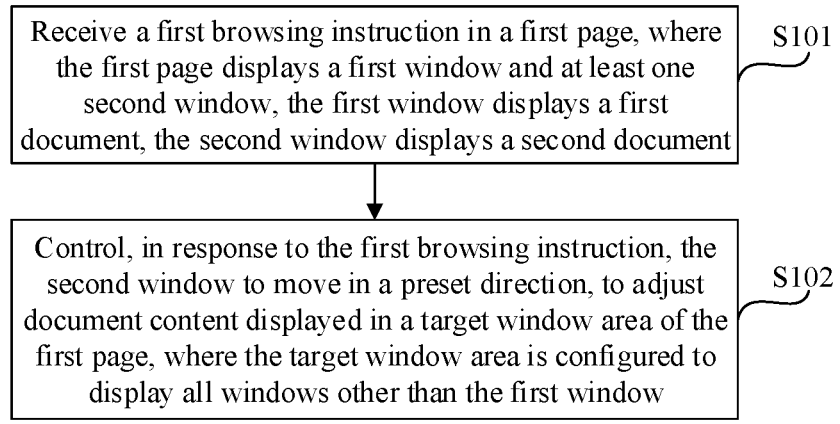
FIG. 1 is a schematic flowchart of a document display method according to an embodiment of the present disclosure.

Embodiments of the present disclosure will be described in more detail below with reference to the drawings. Although certain embodiments of the present disclosure are shown in the drawings, it should be understood that the present disclosure may be embodied in various forms and should not be construed as limited to the embodiments set forth herein. On the contrary, these embodiments are provided to provide a more thorough and complete understanding of the present disclosure. It should be understood that the drawings and embodiments of the present disclosure are for exemplary purposes only, and are not intended to limit the protection scope of the present disclosure.

It should be understood that the various steps described in the method embodiments of the present disclosure may be executed in different orders, and/or executed in parallel. Additionally, the method embodiments may include additional steps and/or omit performing illustrated steps. The scope of the present disclosure is not limited in this respect.

As used herein, the term "comprise" and its variations are open-ended, i.e. "including but not limited to". The term "based on" means "based at least in part on". The term "one embodiment" means "at least one embodiment". The term "another embodiment" means "at least one another embodiment". The term "some embodiments" means "at least some embodiments." Relevant definitions of other terms will be given in the description below.

It should be noted that wordings such as "first" and "second" mentioned in the present disclosure are only used to distinguish different devices, modules or units, and are not used to limit the order of functions performed by these devices, modules or units or interdependence therebetween.

It should be noted that the wordings of "one" and "multiple" mentioned in the present disclosure are illustrative and not restrictive, and those skilled in the art should understand that unless the context clearly indicates otherwise, it should be understood as "one or more".

The names of messages or information exchanged between multiple devices in the embodiments of the present disclosure are used for illustrative purposes only, and are not used to limit the scope of these messages or information.

FIG. 1 is a schematic flowchart of a document display method according to an embodiment of the present disclosure. The method may be performed by a document display apparatus. The apparatus may be implemented by software and/or hardware, and may be configured in an electronic device, typically, in a computer device. The document display method according to the embodiment of the present disclosure is applicable to the scenario of comparatively viewing multiple documents. As shown in FIG. 1, the document display method according to this embodiment may include the following steps S101 and S102.

In step S101, a first browsing instruction is received in a first page, where the first page displays a first window and at least one second window, the first widow displays a first document, and the second window displays a second document.

The first page may be a page used for displaying documents, and the first page may include multiple windows each displaying the same or different documents. If a same document is displayed in two windows, the contents displayed in the two windows may be the same or different, that is, the same or different contents of the document may be displayed in the two windows. Preferably, different contents of the document are displayed in the two windows, so that the user can view more content of this document in the first page. Correspondingly, the first window and the second window are windows used to display documents in the first page. The first window may be a window that is always displayed in the first page, that is, the first window will not be moved out of the first page (that is, remaining in the first page for displaying) based on the first browsing instruction, and the number of the first window may be one or more. The second window may be a window that may be moved out of the first page based on the first browsing instruction, and the number of the second window may be one or more. The first document may be a document displayed in the first window, the second document may be a document displayed in the second window, and the first document and the second document may be the same or different. The first browsing instruction may be an instruction used for controlling the movement of the second window displayed in the first page to browse the content of the second document displayed in each second window in the first page, which may be generated based on a trigger operation of a user. For example, the first browsing instruction may be generated based on a swipe operation of the user on the first page, or based on an operation of the user of dragging a scroll bar in the first page.

Figure 2:
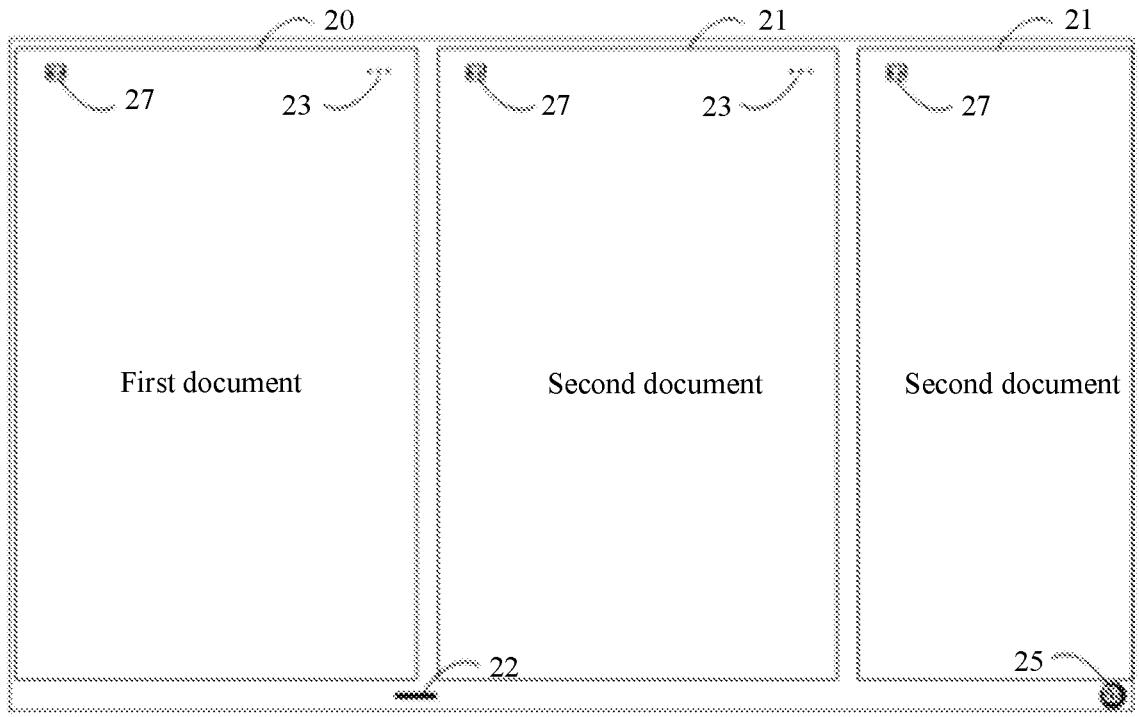
FIG. 2 is a schematic diagram of a first page according to an embodiment of the present disclosure.

Exemplarily, as shown in FIG. 2 (FIG. 2 shows an example where a leftmost window is the first window and the windows are arranged horizontally), an electronic device displays a first page, and the first page displays a first window 20 and one or more second windows 21, the first window 20 displays a first document, each second window 21 displays a corresponding second document. Further, the first page displays a scroll bar 22 for adjusting the windows displayed in the first page. Therefore, when a user wants to browse the second windows 21 displayed in the first page, the user may perform a corresponding browsing operation in the first page, such as swiping along a preset direction in the first page. For example, when the second windows 21 are horizontally arranged in the first page, the user may swipe left and right in the first page (that is, swipe from left to right and/or swipe from right to left in the first page). When the second windows 21 are vertically arranged in the first page, the user may swipe up and down in the first page (that is, swipe from top to bottom and/or swipe from bottom to top in the first page), or drag the scroll bar 22 displayed in the first page. Correspondingly, when detecting that the user performs a browsing operation in the first page, the electronic device may generate the first browsing instruction.

In step S102, in response to the first browsing instruction, the second window is controlled to move in a specific direction, to adjust a document content displayed in a target window area of the first page, and the target window area is configured to display all windows other than the first window.

The specific direction may be a preset direction, such as from left to right, from right to left, from top to bottom, or from bottom to top. The specific direction may also be a direction corresponding to the first browsing direction, such as a direction in which the user swipes in the first page and a direction in which the user drags the scroll bar. The target window area may be configured to display the second windows, that is, an area in the window display area (i.e., the area used to display the first window and the second window) of the first page other than an area used to display the first window.

In this embodiment, when multiple documents are displayed, the electronic device may fix a display position of one of the documents, and control other documents to move in response to a received first browsing instruction, to move documents outside the first page into the first page, and/or, move the documents in the first page out of the first page, thereby adjusting the document content displayed in the target window area of the first page, and further enabling the user to comparatively view the first document with different documents displayed in the target window area.

Exemplarily, when receiving the first browsing instruction, the electronic device may control each second window to move along a specific direction. For example, the electronic device may: control each second window to move along the corresponding direction if the user swipes in the first page or the user controls the scroll bar to move; stop controlling each second window to move in the corresponding direction when the user stops swiping in the first page or stops controlling the scroll bar to move; stop displaying a second window/partial area of the second window that has moved out of the target window area when the second window/partial area of the second window moves out of the target window area; and display document content displayed in a second window/partial area of the second window when the second window/the partial area of the second window moves into the target window area, to adjust the document content displayed in the target window area.

In this embodiment, if there are multiple second windows, the second windows may be controlled to move synchronously. In this case, preferably, controlling the second window to move in a specific direction to adjust document content displayed in the target window area of the first page includes: controlling the second windows to move synchronously in the specific direction, displaying a second document of the second window moved into the target window area, and stopping displaying a second document of the second window moved out of the target window area, to adjust the document content displayed in the target window area.

Specifically, the second windows may be controlled to move synchronously at a preset speed. In addition, for each second window, during the movement of the second window, when the second window has an area that moves into the target window area, the area within the target window area is displayed, that is, the content of the second document that should be displayed in the area is displayed; and when the second window has an area that moves out of the target window area, the area outside the target window area is stopped being displayed, that is, the content of the second document that should be displayed in the area is stopped being displayed.

It can be understood that, when controlling the second windows to move in a specific direction, the electronic device may further control the first window to move in the specific direction until the first window moves to one side of the first page.

Taking the case that the windows (including the first window and the second window) in the first page are arranged horizontally (that is, arranged from left to right) in the first page and one first window is displayed in the first page as an example, when the specific direction corresponding to the first browsing instruction is from left to right, if the first window is not located on the right side of the first page (that is, the right border of the first window overlaps with the right border of the window display area of the first page), in response to the first browsing instruction, the electronic device may control the first window and each second window in the first page to move to the right synchronously; and after the first window moves to the right side of the first page, control the first window to stop moving, and control each second window to continually move to the right synchronously until fulfilling the response to the first browsing instruction. If the first window is already located on the right side of the first page, in response to the first browsing instruction, the electronic device may control each second window in the first page to move to the right synchronously until the response to the first browsing command is fulfilled.

In the case that the specific direction corresponding to the first browsing instruction is from right to left, if the first window is not located on the left side of the first page (that is, the left border of the first window overlaps with the left border of the window display area of the first page), in response to the first browsing instruction, the electronic device may control the first window and each second window in the first page to move to the left synchronously; and after the first window moves to the left side of the first page, control the first window to stop moving, and control each second window to continually move to the left synchronously until the response to the first browsing instruction is fulfilled. If the first window is already on the left side of the first page, in response to the first browsing instruction, the electronic device may control each second window in the first page to move to the left synchronously until the response to the first browsing instruction is fulfilled.

In addition, if the first window is not located in the first page and/or is partially located in the first page when the first browsing instruction is received, the first window may be moved to a side of the first page closest to the first window when the first browsing instruction is received, and then the operation of controlling the movement of the first window and/or the second window is performed.

In an exemplary embodiment, the document display method according to this embodiment further includes: adjusting a display range of a target window in the first page in response to a first trigger operation on a maximize control of any target window displayed in the first page, to separately display, in the first page, the second target document of the target window.

The first trigger operation is used for triggering a maximize control of a certain window displayed in the first page, such as an operation of clicking a maximize control of a certain window. The maximize control may be used to be triggered by the user to instruct the electronic device to maximize a window where the maximize control is located. The target window is the window where the maximize control triggered by the user is located, which may be the first window or the second window displayed in the first page. Correspondingly, the second target document may be a document displayed in the target window, which may be the first document or the second document.

In this embodiment, as shown in FIG. 2, each of the windows displayed in the first page of the electronic device may be provided with a maximize control 27. Thereby, when the user wants to view a certain document (i.e. the second target document) alone, the user may trigger the maximize control 27 of the target window displaying the document. Correspondingly, when detecting that the user triggers the maximize control 27 of the target window, the electronic device may adjust the display range of the target window in the first page, such as adjusting the boundaries of the target window to overlap with the corresponding boundaries of the window display area of the first page, and correspondingly expanding the display range of the second target document displayed in the target window, to separately display the second target document in the first page, satisfying the requirement of the user of separately viewing the second target document displayed in the first page.

In addition, in a case that the second target document is displayed separately in the first page, the electronic device may further switch the maximize control in the target window to a restore control, thus, when the user wants to view multiple documents in the first page again, the user may trigger the restore control. Correspondingly, when detecting that the user triggers the restore control of the target window, the electronic device may restore the content displayed in the first page to a state before receiving the first trigger operation, that is, restore the display range of the target window to a display range before maximization, and adjust the display position of the target window in the first page to a display position before maximization.

In an exemplary embodiment, the document display method according to this embodiment further includes: adjusting a display order of a third target document in the first page in response to an order adjustment instruction for the third target document displayed in the first page.

The order adjustment instruction may be used for instructing the electronic device to adjust the display order of a certain document displayed in the first page. The order adjustment instruction may be generated based on the order adjustment operation of the user, e.g., generated when detecting that the user drags a window displayed in the first page or when detecting that the user drags the identification information of a document displayed in the management panel, and so on. Correspondingly, the third target document may be a document corresponding to the order adjustment instruction, that is, the order adjustment instruction instructs the electronic device to adjust the display order of the third target document in the first page. The third target document may include the first document and/or the second document.

In the above embodiment, the user may adjust the arrangement order of the documents displayed in the first page. Specifically, when the user wants to adjust the arrangement order of a certain document (that is, the third target document) in the first page, the user may perform an order adjustment operation for the document, such as dragging the window where the document is located to a desired position before or after a certain window or adjusting the order of the identification information of the document in the management panel of the first page. Therefore, when detecting the order adjustment operation of the user, the electronic device may generate an order adjustment instruction for the document, and adjust the arrangement order of the window where the document is located among the windows in the first page in response to the order adjustment instruction, and adjust the display order of the document among the documents in the first page, so that the user can view the document and documents that precede it and/or follow it in the display order simultaneously or according to the arrangement order.

In the document display method according to this embodiment, a first browsing instruction is received in a first page that displays a first window and at least one second window, where the first window displays a first document, and the second window displays a second document; and in response to the first browsing instruction, the second window is controlled to move in a specific direction, to adjust a document content displayed in a target window area in the first page, where the target window area is configured to display all windows other than the first window. With the above technical solution of the embodiment of the present disclosure, the user can browse other documents in the first page while viewing a document by moving only some windows in the first page, which facilitates the user to comparatively view different documents in the first page, thus improving the user experience.

Figure 3:
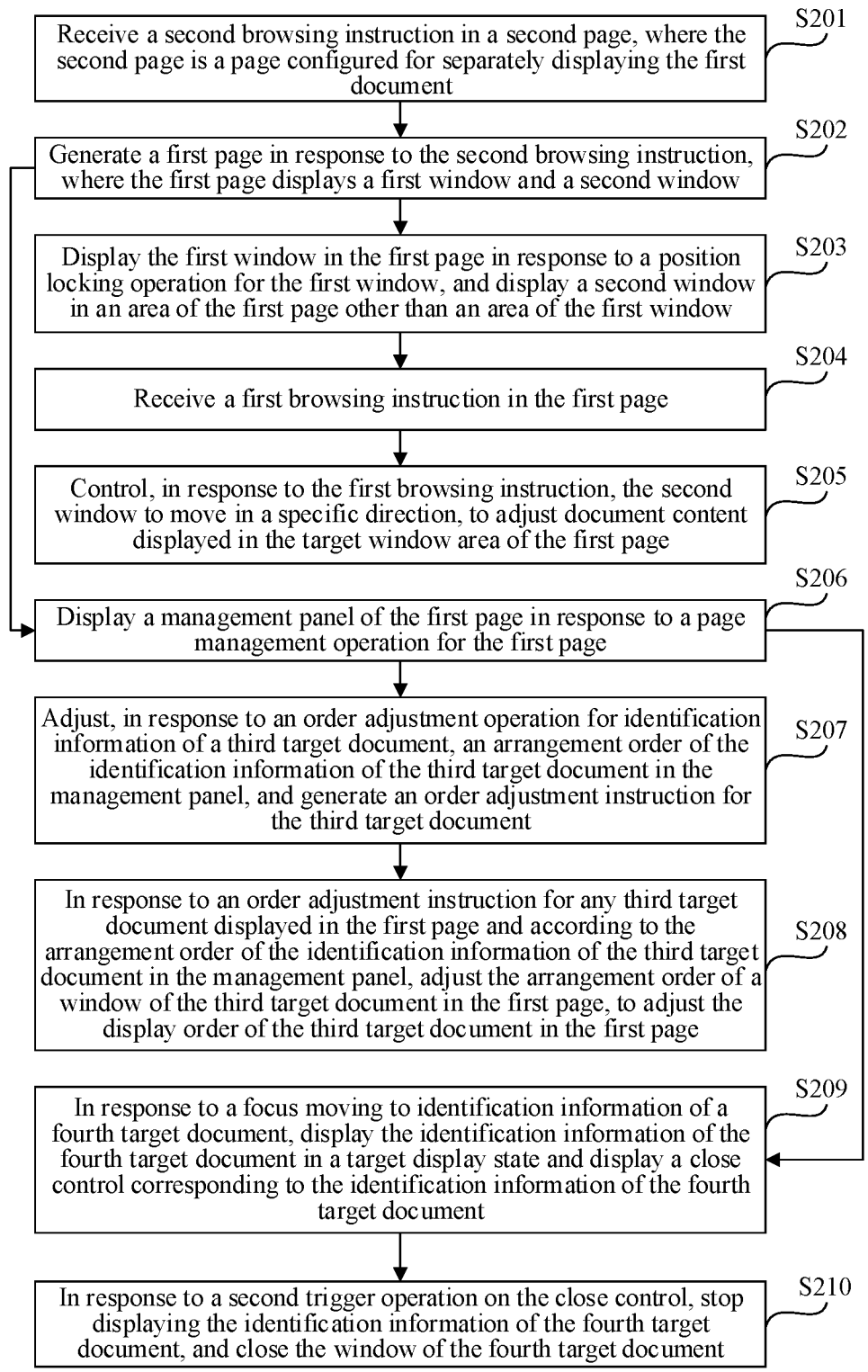
FIG. 3 is a schematic flowchart of a document display method according to another embodiment of the present disclosure.

FIG. 3 is a schematic flowchart of a document display method according to another embodiment of the present disclosure. The solution in this embodiment may be combined with one or more solutions in the foregoing embodiments. Optionally, before receiving a first browsing instruction in a first page, the method further includes: displaying a first window in the first page in response to a position locking operation for the first window, and displaying a second window in an area other than the first window within the first page.

Optionally, before receiving a first browsing instruction in a first page, the method further includes: receiving a second browsing instruction in a second page, where the second page is a page configured for separately displaying the first document; generating the first page in response to the second browsing instruction, where the first page displays the first window and the second window, the first window displays the first document, the second window displays a document adding control, and the document adding control is used to add a second document in the second window.

Optionally, the document display method according to this embodiment further includes: displaying a management panel of the first page in response to a page management operation for the first page, to allow the user to manage documents displayed in the first page, where the management panel displays identification information of the first document and identification information of the second document, the identification information of the first document and the identification information of the second document are arranged in a display order of the first document and the second document in the first page.

Optionally, after displaying the management panel of the first page, the method further includes: adjusting, in response to an order adjustment operation for identification information of a third target document, an arrangement order of the identification information of the third target document in the management panel, and generating an order adjustment instruction for the third target document. The adjusting the display order of the third target document in the first page includes: adjusting an arrangement order of a window of the third target document in the first page according to the arrangement order of the identification information of the third target document in the management panel, to adjust the display order of the third target document in the first page.

Optionally, after displaying a management panel for the first page, the method further includes: displaying, in response to a focus moving to identification information of a fourth target document, the identification information of the fourth target document in a target display state, and displaying a close control corresponding to the identification information of the fourth target document; and in response to a second trigger operation on the close control, stopping displaying the identification information of the fourth target document, and closing a window of the fourth target document.

Correspondingly, as shown in FIG. 3, the document display method according to this embodiment includes the following steps S201 to S210.

In step S201, a second browsing instruction is received in a second page, where the second page is a page configured for separately displaying a first document.

The second page may be a page for displaying a certain document alone, such as a page for displaying the first document alone. The second browsing instruction may be understood as an instruction for instructing the electronic device to generate the first page and display documents in windows of the first page. The second browsing instruction may be generated based on a trigger operation of the user, e.g. the second browsing instruction may be generated when the user clicks on the window display control, which will be described as an example.

Exemplarily, the electronic device displays the second page, and separately displays a document that the user is browsing or editing in the second page. When the user wants to view a document referenced in the document, or when the user wants to make reference to a document, the user may click the window display control in the second page. Correspondingly, when detecting that the user clicks on the window display control in the second page, the electronic device generates a second browsing instruction.

It may be understood that the second page may also be a page that displays the second document alone, that is, the user may also instruct the electronic device to generate the second browsing instruction by executing a corresponding trigger operation when the electronic device displays the second document alone on the second page, to control the electronic device to generate the second page and display the first window in the second page based on the subsequent trigger operation of the user and display the first document in the first window.

In step S202, a first page is generated in response to the second browsing instruction, and step S203 or S206 is performed, where the first page displays a first window and a second window, and the first window displays the first document, the second window displays a document adding control, and the document adding control is used to add a second document in the second window.

Figure 4:
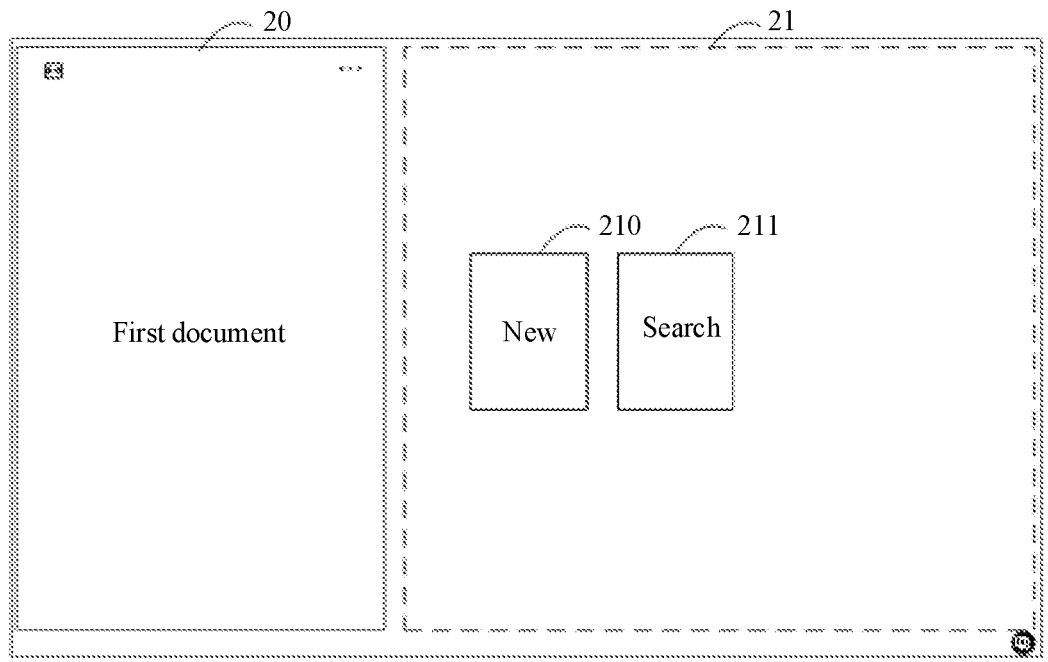
FIG. 4 is a schematic diagram of a first page according to another embodiment of the present disclosure.

The first page may be a page displaying documents in windows. As shown in FIG. 4, the first page may include a first window 20 and a second window 21, the second window 21 may display the document adding control, and the document adding control may be any control that may be triggered by the user to add a document in the first page, such as a new control 210 or a search control 211.

Specifically, once receiving the second browsing instruction, the electronic device generates, in response to the second browsing instruction, the first page that displays documents in windows, for example, switches the currently displayed page from the second page to the first page that includes the first window and the second window, and display the first document of the second page in the first window of the first page, and displays the document adding control in the second window of the first page; or, shrinks the display range of the first document in the second page, to obtain the first window, and determines the displayable area of the second page other than an area of the first window as the second window, and display the document adding control in the second window to obtain the first page.

In this embodiment, after the first page is generated, the user may add a new document by triggering the document adding control displayed in the second window, such as adding a new blank document or adding a document created by the user or other users, etc. and display the new document as the first document and/or the second document in the first page, such as directly switching the current display content of the second window to the content of the new document, or creating a new second window in the first page, and display the content of the new document in the new second window.

Taking adding a second document as an example, after generating the first page, the method may further include: generating a blank second document in the second window in response to a trigger instruction on the document adding control; or generating a new second window in response to a trigger instruction on the document adding control, and generate a blank second document in the new second window; or obtaining a first target document in response to a trigger instruction on the document adding control, and adding the first target document to the second window; or, obtaining a first target document and generating a new second window in response to the trigger instruction on the document adding control, and adding the first target document to the new second window.

The trigger instruction on the document adding control may be an instruction for triggering the document adding control displayed in the second window, which may be generated when the user triggers (such as clicks) the document adding control displayed in the second window or the user clicks on a document link included in the first document in the first window. The first target document may be an already-created document that the user wants to add, such as a document searched by the user or a document referenced in the first document in the first window.

Exemplarily, as shown in FIG. 4, the electronic device displays a first window 20 and a second window 21, the first window 20 displays a first document, and the second window 21 displays a new control 210 and a search control 211.

Figure 5:
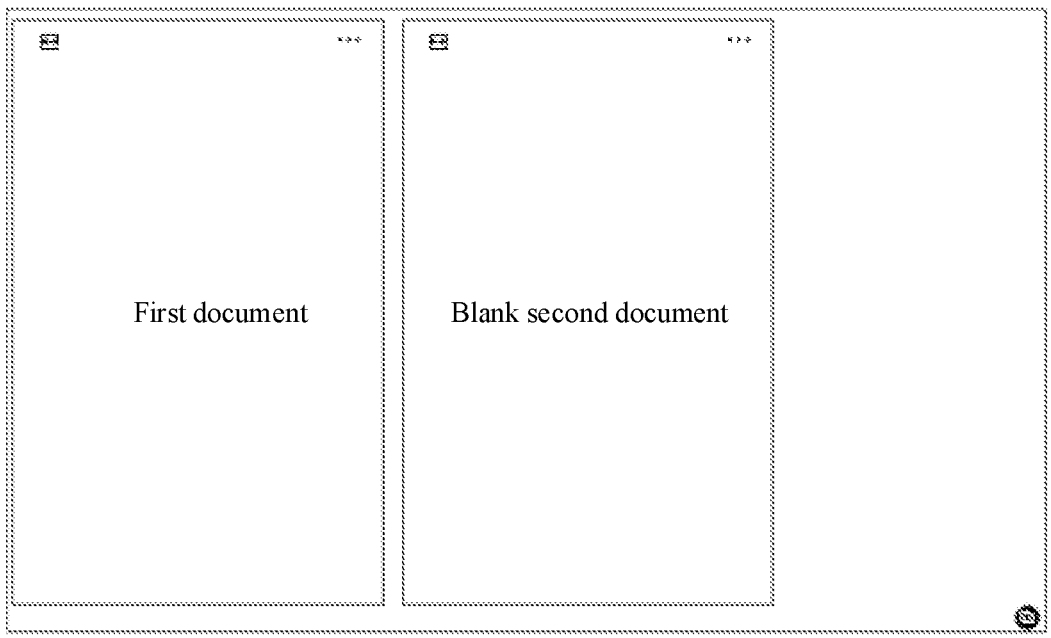
FIG. 5 is a schematic diagram of a display mode of a blank second document according to an embodiment of the present disclosure.
Figure 6:
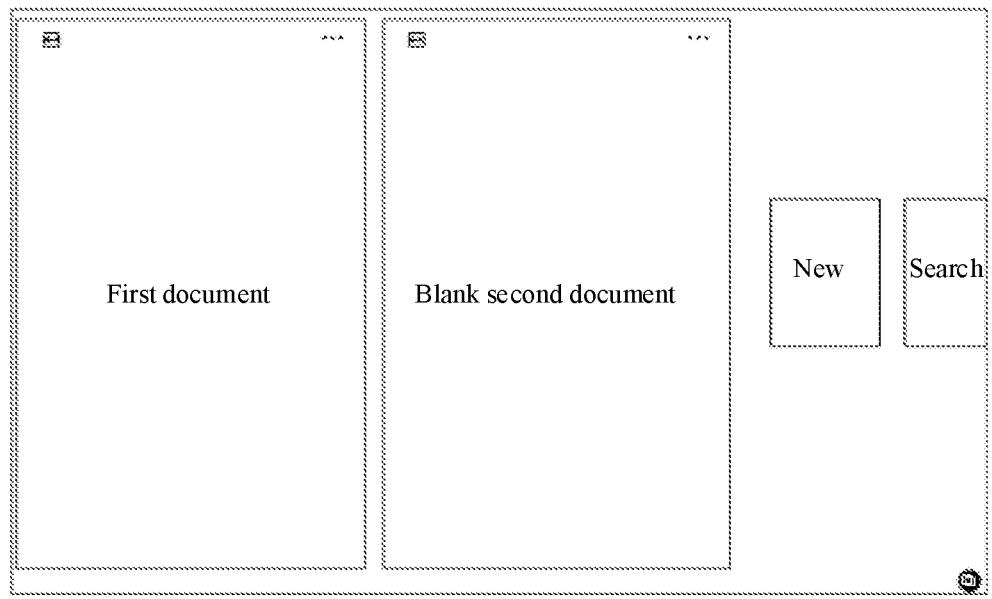
FIG. 6 is a schematic diagram of a display mode of a blank second document according to another embodiment of the present disclosure.

When the user wants to newly create a blank second document, the user may trigger the new control. Correspondingly, when the electronic device detects that the user triggers the new control in the second window, the electronic device may determine that a trigger instruction on the document adding control is received, generate a blank second document in response to the trigger instruction, and display the blank second document in the second window, and may further stop displaying the new control and the search control in the second window, as shown in FIG. 5; or, the electronic device may newly create a second window in the first page, and display the blank second document in the newly created second window, as shown in FIG. 6.

Figure 7:
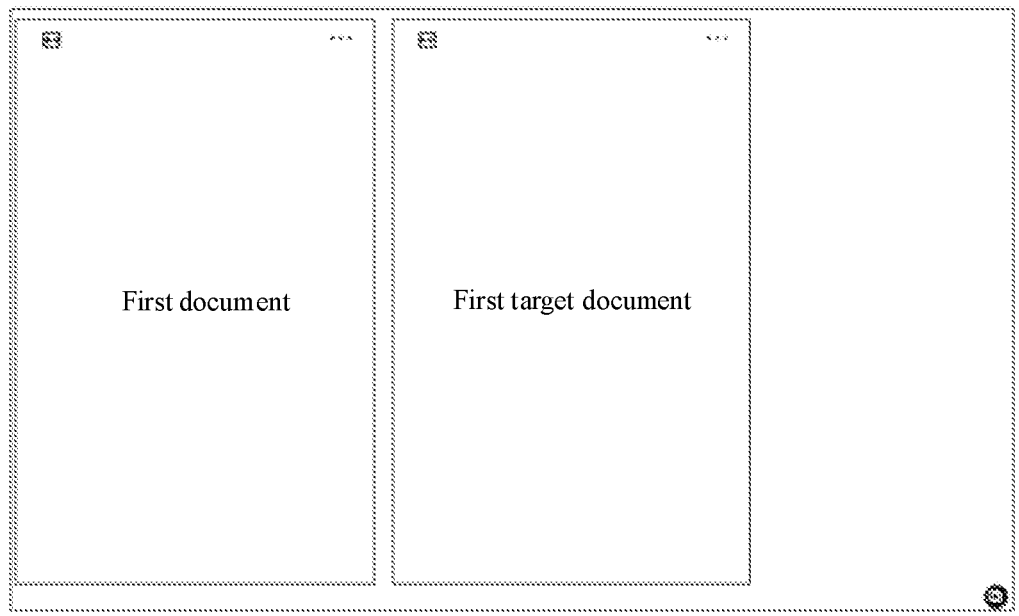
FIG. 7 is a schematic diagram of a display mode of a first target document according to an embodiment of the present disclosure.
Figure 8:
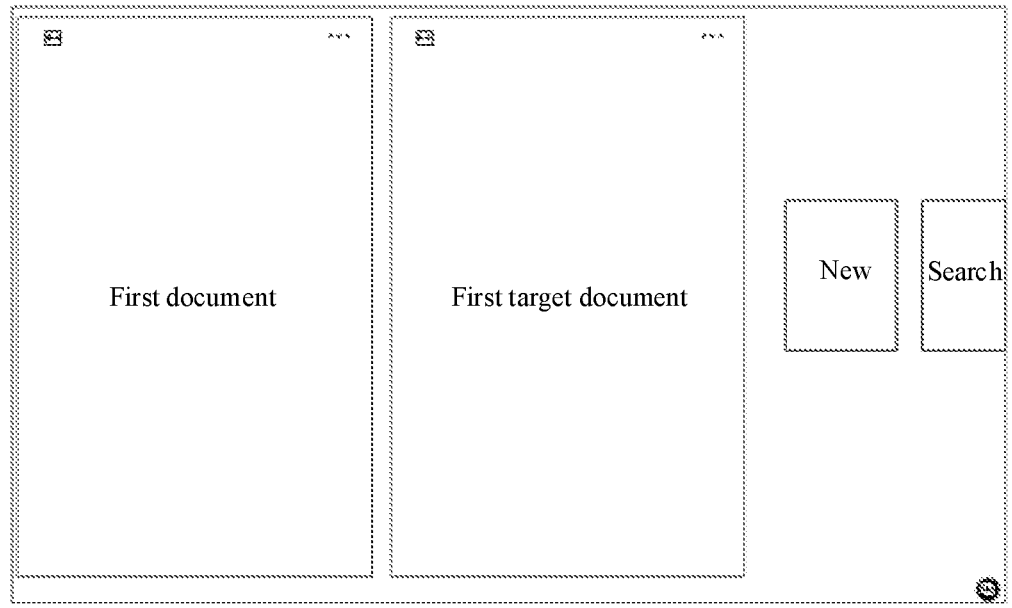
FIG. 8 is a schematic diagram of a display mode of a first target document according to another embodiment of the present disclosure.

When the user wants to view a document referenced in the first document, the user may trigger the link of the referenced document included in the first document. Correspondingly, when the electronic device detects that the user triggers a link of a referenced document in the first document, the electronic device may determine that a trigger instruction on the document adding control is received, and determine the referenced document as the first target document, acquire the first target document in response to the trigger instruction, display the first target document in the second window, and may further stop displaying the new control and the search control in the second window, as shown in FIG. 7; or, the electronic device may newly create a second window in the first page, and display the first target document in the newly created second window, as shown in FIG. 8.

Figure 9:
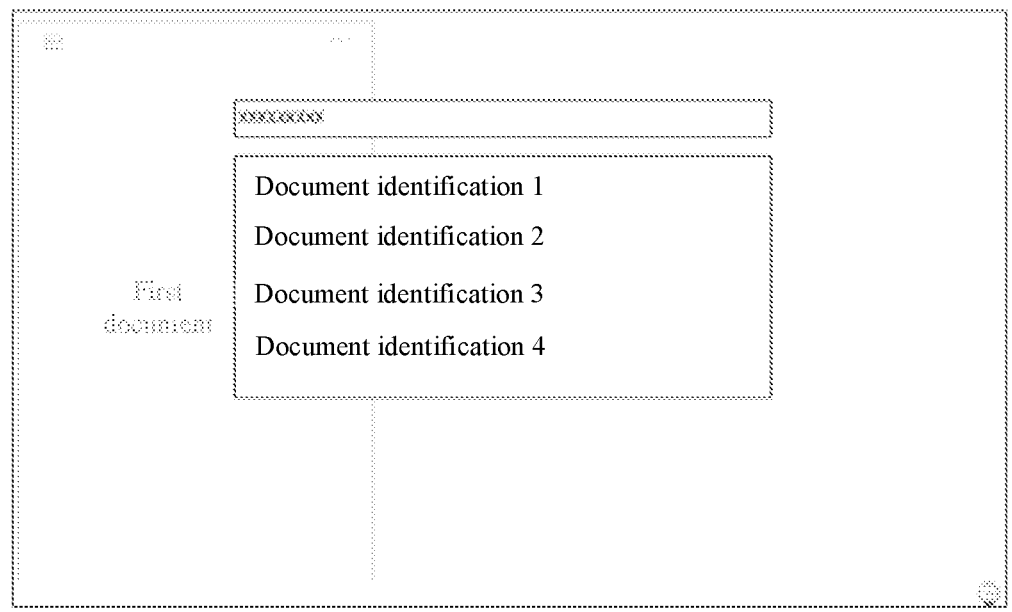
FIG. 9 is a schematic diagram of a display mode of a search box according to an embodiment of the present disclosure.

When the user wants to make reference to a certain document (including the document referenced in the first document), the user may trigger the search control in the second window. When the electronic device detects that the user triggers the search control in the second window, the electronic device may display a search box in the first page or in the second window, so that the user can input in the search box a keyword of the first target document he wants to view. The electronic device performs a search based on the keyword inputted by the user in the search box, display a list of documents matching with the keyword inputted by the user, and display the document identification of the documents (such as the name of the documents) matching with the keyword inputted by the user in the list, as shown in FIG. 9 (FIG. 9 takes the search box displayed in the first page as an example). In this way, the user may select the document identification of the document to be referenced from the list. Correspondingly, when the electronic device detects that the user selects the document identification of a certain document, the electronic device may use the document as the first target document, obtain the first target document, and display the first target document in the second window, and may further stop displaying the new control and the search control in the second window, as shown in FIG. 7; or the electronic device may newly create a second window in the first page, and display the first target document in the newly created second window, as shown in FIG. 8.

In an exemplary embodiment, the document display method according to this embodiment further includes: displaying the first window in a first display state, and displaying the target second window in a second display state, where the target second window is a second window displaying the blank second document or the first target document; switching the target second window from the second display state to the first display state after the target second window is displayed in the second display state for a preset period of time.

The first display state and the second display state may be different display states. For example, in the first display state a frame of a window may be displayed with a first brightness or a first color, while in the second display state the frame of the window may be displayed with a second brightness (such as highlight) or a second color or the frame of the window is displayed by switching between the first brightness and the second brightness and/or between the first color and the second color at a preset frequency. The window to which the document newly added by the user belongs may be a window displaying a blank second document or the first target document newly added by the user. The preset period of time may be set as required, for example, the preset period of time may be 3 s or 5 s.

In the above embodiment, the window to which the document newly added by the user belongs may be displayed in different display manners, to facilitate the user to quickly determine the newly added document. Specifically, when the electronic device generates the first page, the electronic device may display the first window and the second window in the first page in the first display state, switch the display state of the second window from the first display state to the second display state when displaying the blank second document or the first target document in the second window in response to the trigger instruction on the document adding control in the second window, and switch the display state of the second window back to the first display state after the second window is displayed in the second display state for a preset period of time; or, switch the display state of the newly created second window from the first display state to the second display state after displaying the blank second document or the first target document in the newly created second window in response to the trigger instruction on the document adding control in the second window, and switch the display state of the newly created second window back to the first display state after the newly created second window is displayed in the second display state for a preset period of time.

In step S203, the first window is displayed in the first page in response to a position locking operation for the first window, and a second window is displayed in an area other than the first window within the first page.

The position locking operation may be understood as an operation of locking a display position of a certain window displayed in the first page, such as an operation of clicking a position locking control of a certain window or an operation of sliding according to a preset trajectory shape or direction in the first page. The position locking control may be displayed directly in a window or in a "more" panel in the window. The first window may be determined based on the position locking operation of the user, that is, a window on which the user performs the position locking operation may be determined as the first window, a document in the first window may be determined as the first document, and a window displaying documents other than the first window is determined as the second window, and a document displayed in the second window is determined as the second window.

Figure 10:
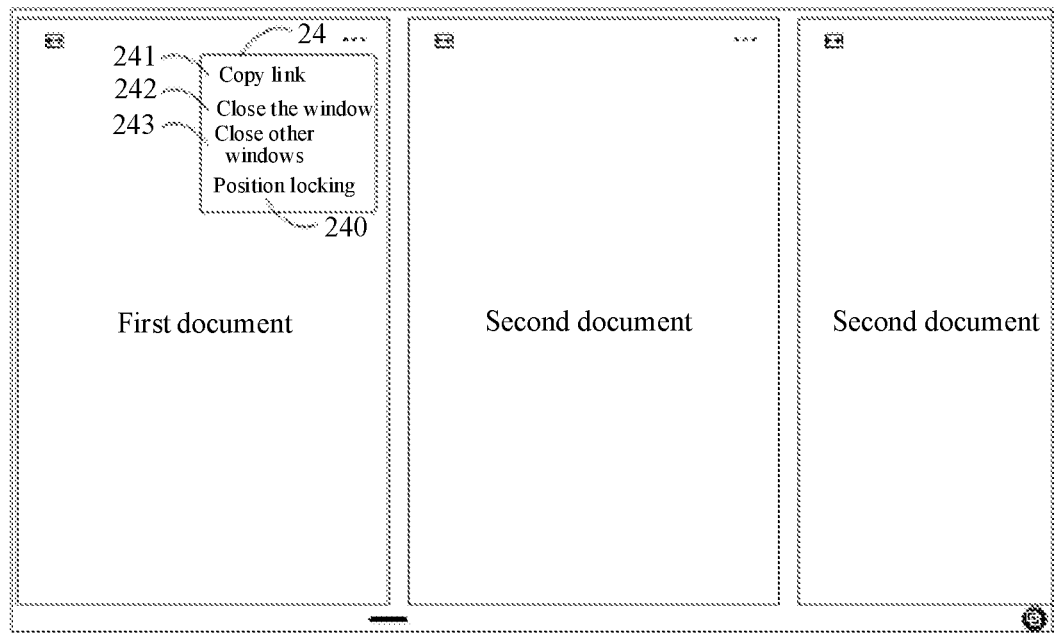
FIG. 10 is a schematic diagram of a "more" panel according to an embodiment of the present disclosure.

Exemplarily, as shown in FIG. 2, the electronic device may display multiple windows displaying documents, and display a "more" control 23 in each window. When the user wants to control a window by using a "more" control 23 of the window, the user may trigger the "more" control 23 in the window. When the electronic device detects that the user triggers the "more" control 23 in a certain window, the electronic device displays the "more" panel 24 corresponding to the window, and displays controls included in the "more" panel 24, such as the position locking control 240, as shown in FIG. 10. In this way, when the user wants to instructs the electronic device not to move the window out of the first page when receiving the first browsing instruction, the user may trigger the position locking control 240 for this window. Correspondingly, when the electronic device detects that the user triggers the position locking control 240 for a certain window, the electronic device may use the window as the first window, determine that the position locking operation for the first window is received, and display the first window in the first page in response to to the position locking operation (that is, the first window cannot be moved outside the displayable area of the first page), and display the second window in the window display area of the first page other than an area of the first window.

In this embodiment, the first window may be displayed in the first page flexibly, such as being movably displayed in the first page (that is, the first window may be moved in the window display area of the first page after being locked). For example, the arrangement order of the windows is not changed when receiving the position locking operation, only the first window is locked in the first page, and when the first browsing instruction is received, the first window is controlled to move in the first page following an adjacent window until reaching a side of the first page. Alternatively, the first window may be displayed fixedly in the first page (that is, the display position of the first window in the first page is fixed after being locked). For example, when a position locking operation is received, the first window is displayed at a preset position (such as a side of the first page), or the first window is displayed at the current position, or the display position of the first window is determined based on the position locking operation and the first window is displayed at the display position, and when receiving the first browsing instruction, only the second window is controlled to move without adjusting the display position of the first window. In this case, preferably, displaying the first window in the first page includes: fixing the display position of the first window at a preset position of the first page; or, fixing the position of the first window at the display position where the first window is when the position locking operation occurs; or, determining a fixed position based on a moving trajectory of the position locking operation and fixing the position of the first window at the fixed position.

Here, the fixed position may be determined based on the moving trajectory of the position locking operation. For example, when the moving trajectory of the position locking operation is a clockwise moving trajectory, the fixed position may be determined as one side (such as the right side) of the first page; when the moving trajectory of the position locking operation is a counterclockwise moving trajectory, the fixed position may be determined as the other side (such as the left side) of the first page; or the end position of the moving trajectory may be determined as a position of the center line of the first window, and the position of the center line is used as a point on the center line of the first window to display the first window, which is not limited in this embodiment.

In addition, referring to FIG. 10, the "more" panel 24 may further display a copy link control 241, a window close control 242 and/or a close other window control 243, so that the user may trigger the copy link control 241 of the "more" panel 24 in a certain window to instruct the electronic device to copy a link of a document displayed in the window, and may instruct the electronic device to display the document separately by pasting the link; the user may trigger the window close control 242 to instruct the electronic device to close the window; and the user may trigger the close other window control 243 to instruct the electronic device to close all windows displayed in the first page other than this window.

In step S204, a first browsing instruction is received in the first page, where the first page displays a first window and at least one second window, the first window displays a first document, and the second window displays a second document.

In step S205, in response to the first browsing instruction, the second window is controlled to move in a specific direction, to adjust document content displayed in the target window area of the first page, where the target window area is configured to display all windows other than the first window.

In step S206, in response to a page management operation for the first page, a management panel of the first page is displayed, and step S207 or S209 is performed, so that the user can manage documents displayed in the first page, where the management panel displays identification information of the first document and identification information of the second document, and the identification information of the first document and the identification information of the second document are arranged according to the display order of the first document and the second document in the first page.

The page management operation may be an operation of instructing the electronic device to display a management panel of the first page to manage content displayed in the first page, such as an operation of triggering a management control displayed in the first page. The identification information of each document may be any information capable of identifying the document, such as a document name, a document ID, and/or a thumbnail of the document, and the following description takes the identification information as a thumbnail of the document as an example.

Figure 11:
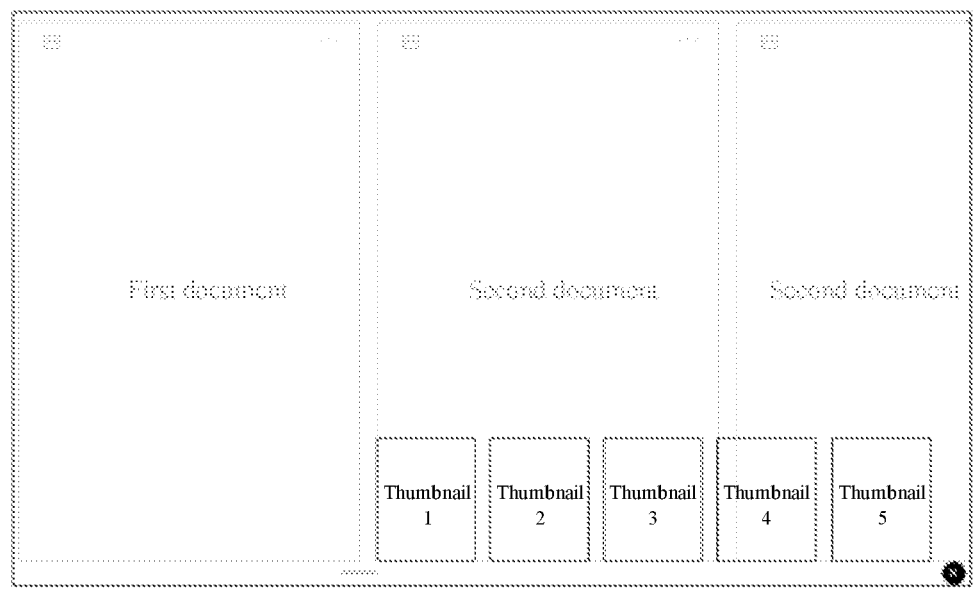
FIG. 11 is a schematic diagram of a management panel according to an embodiment of the present disclosure.

Exemplarily, as shown in FIG. 2, the electronic device displays a first page, and the first page displays multiple documents and a management control 25. When the user wants to manage the documents displayed in the first page, the user may trigger the management control 25. Correspondingly, when the electronic device detects that the user triggers the management control 25 in the first page, the electronic device determines that a page management operation for the first page is received, and displays a management panel of the first page in response to the page management operation, for example, displays the management panel of the first page on an upper layer of the first page, and displays thumbnails of the documents of the first page in the management panel according to the arrangement order of the documents in the first page, as shown in FIG. 11.

In step S207, in response to an order adjustment operation for identification information of a third target document, an arrangement order of the identification information of the third target document in the management panel is adjusted, and an order adjustment instruction for the third target document is generated.

The order adjustment operation may be a trigger operation for adjusting an arrangement order of identification information of a certain document in the management panel, such as an operation of dragging the identification information of the document from the current position of the management panel to a position before or after other identification information. The third target document is a document corresponding to the identification information subjected to the order adjustment operation, such as the first document or the second document.

In this embodiment, the user may adjust an arrangement order of identification information in the management panel through a drag operation, to adjust an arrangement order of documents corresponding to the identification information in the first page. Specifically, when the electronic device detects that the user drags the identification information of a document displayed in the management panel, the electronic device may control the identification information to move along with the drag operation in the management panel until the drag operation is completed, so that the identification information is moved to the position in the arrangement order when the drag operation is completed, and an order adjustment instruction for the document corresponding to the identification information is generated according to the arrangement order of this identification information among all the identification information after the adjustment.

In step S208, in response to an order adjustment instruction for a third target document displayed in the first page, the arrangement order of a window of the third target document in the first page is adjusted according to the arrangement order of the identification information of the third target document in the management panel, to adjust the display order of the third target document in the first page.

In this embodiment, after the user adjusts the arrangement order of certain identification information in the management panel, the electronic device may further adjust the arrangement order of the third target document to which the identification information belongs among the documents displayed in the first page. For example, according to the order of the identification information of each document in the management panel, the electronic device may adjust the arrangement order of the window corresponding to each document in the first page, so that the arrangement order of each document in the first page is consistent with the arrangement order of the identification information of each document in the management panel, which is convenient for users to manage.

In an exemplary embodiment, after adjusting the arrangement order of the window of the third target document in the first page, the method further includes: displaying windows in the first page at an underlying layer of the management panel according to the adjusted arrangement order of the windows in the first page, and the windows include the first window and the second window.

In the above embodiment, when adjusting the arrangement order of the identification information of the third target document in the management panel, the electronic device may also adjust the arrangement order of windows of documents (including the window of the third target document) in the first page in real time. Specifically, the electronic device may display the management panel as a floating layer at the upper layer of the first page, as shown in FIG. 11, and adjust the arrangement order of the third target document in the first page at the underlying layer of the management panel in real time when the user adjusts the arrangement order of the identification information of the third target document in the management panel, so that the user may preview the display effect of the first page after order adjustment.

In step S209, in response to a focus moving to identification information of a fourth target document, the identification information of the fourth target document is displayed in a target display state, and a close control corresponding to the identification information of the fourth target document is displayed.

The fourth target document may be a document to whose identification information the focus (such as a cursor) moves.

In this embodiment, when a focus moves to a display position of identification information of a certain document, the electronic device may switch a display state of the identification information, such as moving the display position of the identification information up or down (for a case that identification information of documents are arranged horizontally in the management panel), or, moving the display position of the identification information to the left or right (for a case that identification information of documents are arranged vertically in the management panel); and/or, switching the display mode (such as a display style, a display color or a transparency) of the identification information, so that the user can distinguish the identification information where the focus moves to.

In addition, when the focus moves to the display position of the identification information of the certain document, the electronic device may further display the close control corresponding to the identification information, to facilitate the user to distinguish the identification information where the focus is moved to, so that the user instructs the electronic device to stop displaying the identification information by triggering the close control.

Figure 12:
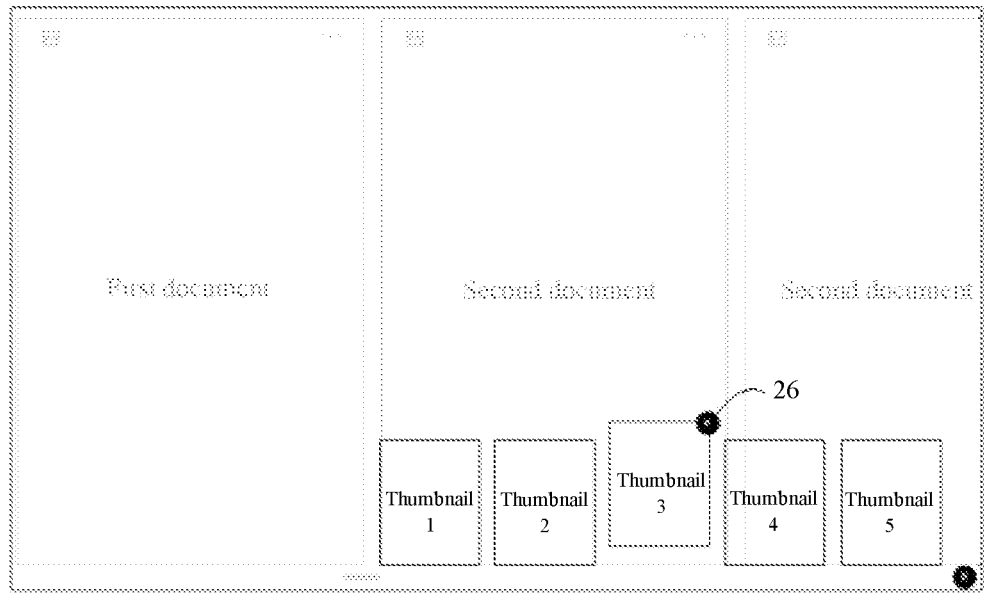
FIG. 12 is a schematic diagram of a display mode of thumbnails according to an embodiment of the present disclosure.

Taking an identification of each document being thumbnail arranged horizontally in the management panel as an example, when the user wants to perform a trigger operation on a thumbnail of a certain document (that is, the fourth target document) displayed on the management panel, the user may control the electronic device to move the focus to the display position of the thumbnail of the document. Correspondingly, when the electronic device detects that the focus moves to the display position of the thumbnail of the certain document, the electronic device may control the thumbnail to move up a preset distance and display the close control 26 corresponding to the thumbnail, as shown in FIG. 12.

In step S210, in response to a second trigger operation on the close control, the identification information of the fourth target document is stopped being displayed, and the window of the fourth target document is closed.

The second trigger operation may be an operation for triggering the close control of the identification information of the fourth target document, such as an operation of clicking the close control of the identification information of the fourth target document.

In this embodiment, the user may instruct the electronic device to stop displaying identification information of a certain document and a window to which the document belongs by triggering a close control of the identification information of the document.

Specifically, when the electronic device detects that the focus moves to a display position of identification information of a certain document (that is, the fourth target document), the electronic device displays the close control corresponding to the identification information of the document. In this way, when the user wants to instruct the electronic device to close the window to which the document belongs, that is, when the user wants to instruct the electronic device to stop displaying the document in the first page, the user may trigger the close control. Correspondingly, when the electronic device detects that the user triggers the close control corresponding to identification information of a certain document, the electronic device may determine that a second trigger operation is received, and stop displaying the identification information of the document in the management panel in response to the second trigger operation, and close the window to which the document displayed in the first page belongs, that is, stop displaying the document in the first page.

In the document display method according to this embodiment, the display position of the first window is fixed based on the position locking operation of the user, and only the second window is controlled to move in response to the first browsing instruction, and the management panel is displayed in response to the page management operation of the user, to facilitate the user to adjust the windows displayed in the page and the display order of each window through the management panel, which not only provides convenience for users to comparatively view documents in different windows, but also realizes the management of the windows displayed in the page, simplifying the operations of the user for page management, improving the user experience.

Figure 13:
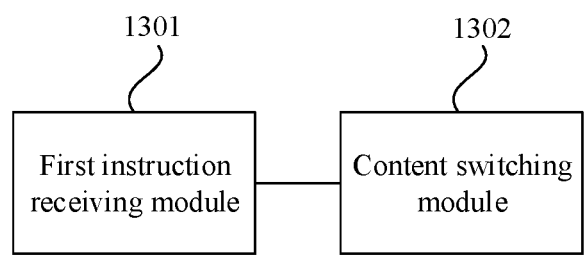
FIG. 13 is a structural block diagram of a document display apparatus according to an embodiment of the present disclosure.

FIG. 13 is a structural block diagram of a document display apparatus according to an embodiment of the present disclosure. The apparatus may be implemented by software and/or hardware, and may be configured in an electronic device, typically, in a computer device, and may display documents by performing a document display method. As shown in FIG. 13, the document display apparatus according to this embodiment may include: a first instruction receiving module 1301 and a content switching module 1302.

The first instruction receiving module 1301 is configured to receive a first browsing instruction in a first page, where the first page displays a first window and at least one second window, and the first window displays a first document, and the second window displays a second document.

The content switching module 1302 is configured to control the second window to move in a specific direction in response to the first browsing instruction, to adjust document content displayed in a target window area of the first page, where the target window area is configured for displaying all windows other than the first window.

In the document display apparatus according to this embodiment, a first browsing instruction is received, by the first instruction receiving module, in a first page that displays a first window and at least one second window, where the first window displays a first document, and the second window displays a second document, and in response to the first browsing instruction, the second window is controlled, by the content switching module, to move in a specific direction, to adjust document content displayed in a target window area in the first page, where the target window area is configured to display all windows other than the first window. With the above technical solution of the embodiment of the present disclosure, the user can browse other documents in the first page while viewing a document by moving only some windows in the first page, which facilitates the user to comparatively view different documents in the first page, thus improving the user experience.

In the above solution, the content switching module 1302 may be configured to: control each of the second windows to move synchronously in a specific direction, display a second document in the second window moved into the target window area, and stop displaying a second document in the second window moved out of the target window area.

Further, the document display apparatus according to this embodiment may further include: a position locking module, configured to display, before receiving a first browsing instruction in a first page and in response to a position locking operation for the first window, the first window in the first page, and display the second window in an area in the first page other than an area of the first window.

In the above solution, the position locking module may be configured to: fix a display position of the first window at a preset position of the first page; or fix a display position of a first window at a position where the first window is located when the position locking operation occurs; or, determine a fixed position based on a moving trajectory of the position locking operation, and fix a display position of the first window at the fixed position.

Further, the document display apparatus according to this embodiment may further include: a second instruction receiving module, configured to receive a second browsing instruction in a second page before receiving a first browsing instruction in a first page, where the second page is a page for independently displaying the first document; a page generating module, configured to generate the first page in response to the second browsing instruction, where the first page displays the first window and the second window, the first window displays the first document, the second window displays a document adding control, and the document adding control is used to add a second document in the second window.

Further, the document display apparatus according to this embodiment may further include: a document adding module, configured to generate a blank second document in the second window in response to a trigger instruction on the document adding control after generating the first page; or in response to a trigger instruction on the document adding control, generate a new second window and generate a blank second document in the new second window; or in response to a trigger instruction on the document adding control, acquire a first target document and add the first target document to the second window; or in response to a trigger instruction on the document adding control, acquire a first target document, generate a new second window, and add the first target document to the new second window.

Further, the document display apparatus according to this embodiment may further include: a first window display module, configured to display the first window in a first display state, and display a target second window in a second display state, where the target second window is a second window that displays the blank second document or the first target document; and a state switching module, configured to switch the target second window from the second display state to the first display state after the target second window is displayed in the second display state for a preset period of time.

Further, the document display apparatus according to this embodiment may further include: a range adjustment module, configured to adjust a display range of the target window in the first page in response to a first trigger operation on a maximize control of a target window displayed in the first page, to independently display, in the first page, a second target document in the target window.

Further, the document display apparatus according to this embodiment may further include: an order adjustment module, configured to adjust a display order of a third target document in the first page in response to an order adjustment instruction for a third target document displayed in the first page.

Further, the document display apparatus according to this embodiment may further include: a panel display module, configured to display a management panel of the first page in response to a page management operation for the first page, for the users to manage the documents displayed in the first page, where the management panel displays identification information of the first document and identification information of the second document, the identification information of the first document and the identification information of the second document are arranged according to the display order of the first document and the second document in the first page.

Further, the document display apparatus according to this embodiment may further include: an identification adjustment module, configured to adjust, after displaying a management panel of the first page and in response to an order adjustment operation for identification information of a third target document, an arrangement order of the identification information of the third target document in the management panel, and generating an order adjustment instruction for the third target document. The order adjustment module may be configured to: adjust an arrangement order of a window of the third target document in the first page according to the arrangement order of the identification information of the third target document in the management panel and in response to the order adjustment instruction for the third target document displayed in the first page, to adjust the display order of the third target document in the first page.

Further, the document display apparatus according to this embodiment may further include: a second window display module, configured to display, after the adjusting an arrangement order of the identification information of the third target document in the management panel and according to adjusted arrangement order of windows in the first page, the windows in the first page at an underlying layer of the management panel, where the windows in the first page include the first window and the second window.

Further, the document display apparatus according to this embodiment may further include: a control display module, configured to display, after the displaying a management panel for the first page and in a case that a focus moves to identification information of a fourth target document, the identification information of the fourth target document in a target display state, and display a close control corresponding to the identification information of the fourth target document; and a window closing module, configured to stop, in response to a second trigger operation on the close control corresponding to the identification information of the fourth target document, display the identification information of the fourth target document, and close a window of the fourth target document.

The document display apparatus according to the embodiments of the present disclosure may perform the document display method according to any embodiment of the present disclosure, and has corresponding functional modules and beneficial effects for performing the document display method. For technical details not exhaustively described in this embodiment, reference may be made to the document display method according to any embodiment of the present disclosure.

Figure 14:
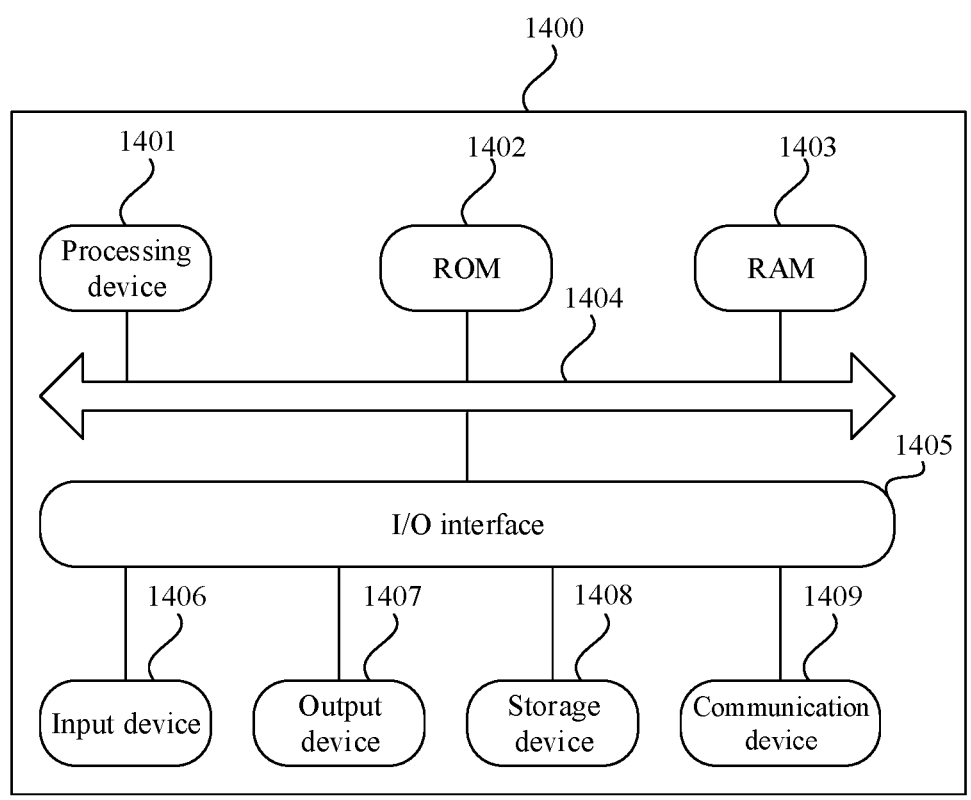
FIG. 14 is a schematic structural diagram of an electronic device according to an embodiment of the present disclosure.

Reference is made to FIG. 14, which is a schematic structural diagram of an electronic device (such as a terminal device) 1400 suitable for implementing an embodiment of the present disclosure. The terminal device in the embodiment of the present disclosure may include, but is not limited to, a mobile terminal such as a mobile phone, a notebook computer, a digital broadcast receiver, a Personal Digital Assistant (PDA), a Tablet (PAD), a Portable Multimedia Player (PMP), a vehicle-mounted terminal (for example, an in-vehicle navigation terminal); and a stationary terminal such as a digital TV, a desktop computer. The electronic device shown in FIG. 14 is only an example, and should not impose any limitation on the function and use range of the embodiments of the present disclosure.

As shown in FIG. 14, the electronic device 1400 may include a processing device (for example, a central processing unit, a graphics processor, and the like) 1401, which may execute various appropriate actions and processes based on programs stored in a read only memory (ROM) 1402 or programs loaded from a storage device 908 into a random access memory (RAM) 1403. In the RAM 1403, various programs and data necessary for the operation of the electronic device 1400 are also stored. The processing device 1401, the ROM 1402, and the RAM 1403 are connected to each other through a bus 1404. An input/output (I/O) interface 1405 is also connected to bus 1404.

In general, the following devices may be connected to the I/O interface 1405: an input device 1406 including, for example, a touch screen, a touch pad, a keyboard, a mouse, a camera, a microphone, an accelerometer, a gyroscope, and the like; an output device 1407 including, for example, a liquid crystal display (LCD), a speaker, a vibrator, and the like.; a storage device 1408 including, for example, a magnetic tape, a hard disk, and the like; and a communication device 1409. The communication device 1409 may allow the electronic device 1400 to communicate wirelessly or by wire with other devices to exchange data. Although FIG. 14 shows an electronic device 1400 having various means, it should be understood that not all of the illustrated means are required to be implemented or available. More or fewer means may alternatively be implemented or provided.

In particular, according to embodiments of the present disclosure, the processes described above with reference to the flowcharts may be implemented as computer software programs. For example, a computer program product is provided according to an embodiment of the present disclosure include, which includes a computer program carried on a non-transitory computer readable medium, the computer program includes program codes for performing the method shown in the flowchart. In the embodiment, the computer program may be downloaded and installed from the network via the communication device 1409, or from the storage device 1408, or from the ROM 1402. When the computer program is executed by the processing device 1401, the functions defined in the methods of the embodiments of the present disclosure are executed.

It should be noted that the computer-readable medium of the present disclosure may be a computer-readable signal medium or a computer-readable storage medium or any combination thereof. The computer-readable storage medium may be, for example, but is not limited to, an electrical, magnetic, optical, electromagnetic, infrared, or semiconductor system, apparatus or device, or any combination thereof. More specific examples of computer readable storage medium may include, but are not limited to, an electrical connection with one or more wires, a portable computer disk, a hard disk, a random access memory (RAM), a read only memory (ROM), an erasable Programmable read only memory (EPROM or flash memory), an optical fiber, a portable compact disk read only memory (CD-ROM), an optical storage device, a magnetic storage device, or any suitable combination thereof. In the present disclosure, the computer-readable storage medium may be any tangible medium that includes or stores a program that may be used by or in conjunction with an instruction execution system, apparatus, or device. In the present disclosure, the computer-readable signal medium may include a data signal propagated in baseband or as part of a carrier wave with computer-readable program code embodied thereon. Such propagated data signals may take a variety of forms, including but not limited to electromagnetic signals, optical signals, or any suitable combination thereof. The computer-readable signal medium may also be any computer-readable medium other than a computer-readable storage medium that may transmit, propagate, or transport the program for use by or in connection with the instruction execution system, apparatus, or device. Program codes embodied on a computer readable medium may be transmitted using any suitable medium including, but not limited to, electrical wire, optical fiber cable, radio frequency (RF), and the like, or any suitable combination thereof.

In some embodiments, the client and the server may use any currently known or future developed network protocol such as HTTP (HyperText Transfer Protocol) to communicate, and may interconnect with any form or medium digital data communications (for example, communications networks). Examples of communication networks include local area networks ("LAN"), wide area networks ("WAN"), the Internet (for example, the Internet), and peer-to-peer networks (for example, ad hoc peer-to-peer networks), as well as any currently known or future development networks.

The computer-readable medium may be included in the electronic device, or exist alone without being assembled into the electronic device.

The computer-readable medium carries one or more programs, and when the one or more programs are executed by the electronic device, the electronic device is caused to: receive a first browsing instruction in a first page, where the first page displays a first window and at least one second window, the first window displays a first document, and the second window displays a second document; and control, in response to the first browsing instruction, the second window to move in a preset direction, to adjust document content displayed in a target window area of the first page, where the target window area is configured to display all windows other than the first window.

Computer program codes for performing operations of the present disclosure may be written in one or more programming languages, including but not limited to object-oriented programming languages, such as Java, Smalltalk, C++, also including conventional procedural programming languages, such as the "C" language or similar programming languages. The program codes may be executed entirely on a computer of a user, partly on a computer of a user, as a stand-alone software package, partly on a computer of a user and partly on a remote computer, or entirely on a remote computer or server. In the case of a remote computer, the remote computer may be connected to the computer of the user through any kind of networks, including a local area network (LAN) or a wide area network (WAN), or may be connected to an external computer (for example, via Internet connection by an Internet service provider).

The flowchart and block diagrams in the Figures illustrate the architecture, functionality, and operation that may be implemented by systems, methods and computer program products according to various embodiments of the present disclosure. In this regard, each block in the flowchart or block diagrams may represent a module, segment, or portion of code that includes one or more executable instructions for implementing specified logical functions. It should also be noted that, in some alternative implementations, the functions noted in the blocks may be implemented out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowcharts, and combinations of blocks in the block diagrams and/or flowcharts, may be implemented in dedicated hardware-based systems that perform the specified functions or operations, or may be implemented in a combination of dedicated hardware and computer instructions.

The units involved in the embodiments of the present disclosure may be implemented in a software manner, or in a hardware manner. The name of the unit does not constitute a limitation of the unit itself under certain circumstances.

The functions described herein may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the present disclosure, a machine-readable medium may be a tangible medium that may include or store a program for use by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination thereof. More specific examples of the machine-readable storage medium may include an electrical connection based on one or more wires, a portable computer disk, a hard disk, a random access memory (RAM), a read only memory (ROM), an erasable programmable read only memory (EPROM or flash memory), a fiber optic, a compact disk read only memory (CD-ROM), an optical storage device, a magnetic storage device, or any suitable combination thereof.

According to one or more embodiments of the present disclosure, a document display method is provided in example 1, which includes:

receiving a first browsing instruction in a first page, where the first page displays a first window and at least one second window, the first window displays a first document, the second window displays a second document; and controlling, in response to the first browsing instruction, the second window to move in a preset direction, to adjust document content displayed in a target window area of the first page, where the target window area is configured to display all windows other than the first window.

According to one or more embodiments of the present disclosure, in example 2, according to the method in example 1, the controlling the second window to move in a preset direction, to adjust document content displayed in a target window area of the first page includes:

controlling the at least one second window to move synchronously in the preset direction;

displaying a second document in the second window moved into the target window area; and stopping displaying a second document in the second window moved out of the target window area, to adjust document content displayed in the target window area.

According to one or more embodiments of the present disclosure, in example 3, according to the method in example 1, before receiving a first browsing instruction in a first page, the method further includes:

displaying, in response to a position locking operation on the first window, the first window in the first page, and displaying the second window in an area in the first page other than an area of the first window.

According to one or more embodiments of the present disclosure, in example 4, according to the method in example 3, the displaying the first window in the first page includes:

fixing a display position of the first window at a preset position of the first page; or fixing a display position of the first window at a position where the first window is located when the position locking operation occurs; or determining a fixed position based on a moving trajectory of the position locking operation, and fixing a display position of the first window at the fixed position.

According to one or more embodiments of the present disclosure, in example 5, according to the method in example 1, before receiving a first browsing instruction in the first page, the method further includes:

receiving a second browsing instruction in a second page, where the second page is a page configured for separately displaying the first document; and generating the first page in response to the second browsing instruction, where the first page displays the first window and the second window, the first window displays the first document, the second window displays a document adding control, and the document adding control is used to add a second document in the second window.

According to one or more embodiments of the present disclosure, in example 6, according to the method in example 5, after the generating the first page, the method further includes:
generating a blank second document in the second window in response to a trigger instruction on the document adding control; or
in response to a trigger instruction on the document adding control, generating a new second window, and generating a blank second document in the new second window; or
in response to a trigger instruction on the document adding control, acquiring a first target document, and adding the first target document to the second window; or
in response to a trigger instruction on the document adding control, acquiring a first target document, generating a new second window, and adding the first target document to the new second window.

According to one or more embodiments of the present disclosure, in example 7, according to the method in example 6, the method further comprising:
displaying the first window in a first display state, and displaying a target second window in a second display state, where the target second window is a second window that displays the blank second document or the first target document; and
switching the target second window from the second display state to the first display state in a case that the target second window is displayed in the second display state for a preset period of time.

According to one or more embodiments of the present disclosure, in example 8, according to the method in any one of examples 1 to 7, the method further comprising:
adjusting a display range of the target window in the first page in response to a first trigger operation on a maximize control of a target window displayed in the first page, to independently display, in the first page, a second target document in the target window.

According to one or more embodiments of the present disclosure, in example 9, according to the method in any one of examples 1 to 7, the method further comprising:
adjusting a display order of a third target document in the first page in response to an order adjustment instruction for a third target document displayed in the first page.

According to one or more embodiments of the present disclosure, in example 10, according to the method in example 9, the method further comprising:
displaying a management panel of the first page in response to a page management operation for the first page, to allow the user to manage the documents displayed in the first page, where the management panel displays identification information of the first document and identification information of the second document, the identification information of the first document and the identification information of the second document are arranged according to the display order of the first document and the second document in the first page.

According to one or more embodiments of the present disclosure, in example 11, according to the method in example 10, after displaying a management panel of the first page, the method further includes:
adjusting, in response to an order adjustment operation for identification information of a third target document, an arrangement order of the identification information of the third target document in the management panel, and generating an order adjustment instruction for the third target document, where
the adjusting the display order of the third target document in the first page includes:
adjusting an arrangement order of a window of the third target document in the first page according to the arrangement order of the identification information of the third target document in the management panel, to adjust the display order of the third target document in the first page.

According to one or more embodiments of the present disclosure, in example 12, according to the method in example 11, after the adjusting an arrangement order of the identification information of the third target document in the management panel, the method further includes:
displaying, according to adjusted arrangement order of windows in the first page, the windows in the first page on an underlying layer of the management panel, where the windows in the first page include the first window and the second window.

According to one or more embodiments of the present disclosure, in example 13, according to the method in example 10, after the displaying a management panel for the first page, the method further includes:
displaying, in a case that a focus moves to identification information of a fourth target document, the identification information of the fourth target document in a target display state, and displaying a close control corresponding to the identification information of the fourth target document; and
stopping, in response to a second trigger operation on the close control corresponding to the identification information of the fourth target document, displaying the identification information of the fourth target document, and closing a window of the fourth target document.

According to one or more embodiments of the present disclosure, a document display apparatus is provided according to example 14, which includes:
a first instruction receiving module, configured to receive a first browsing instruction on a first page, where a first window and at least one second window are displayed in the first page, and a first document is displayed in the first window, the second document is displayed in the second window;
a content switching module, configured to control the second window to move in a specific direction in response to the first browsing instruction, so as to adjust the content of the document displayed in the target window area of the first page, and the target window area is configured to display All windows except said first window.

According to one or more embodiments of the present disclosure, an electronic device is provided according to example 15, which includes:
one or more processors; and
a memory, configured to store one or more programs, where the one or more programs, when executed by the one or more processors, cause the one or more processors to perform the document display method according to any one of examples 1 to 13.

According to one or more embodiments of the present disclosure, a computer-readable storage medium is provided according to example 16, the storage medium stores a computer program, and the computer program is configured to perform the document display method according to any one of examples 1 to 13.

The above description only shows preferred embodiments of the present disclosure and an illustration of the applied technical principles. Those skilled in the art should understand that the scope of the present disclosure is not limited to the technical solutions formed by the specific combination of the technical features, and should also cover, without departing from the disclosed concept, other the technical solutions formed by any combination of the technical features and their equivalent features, for example, a technical solution is formed by replacing the above features with the technical features disclosed in the present disclosure (but not limited to) with similar functions.

Furthermore, although operations are described in a particular order, this should not be construed as requiring that the operations be performed in the particular order shown or in a sequential order. Under certain circumstances, multi-tasking and parallel processing may be advantageous. Likewise, although the above description includes several implementation details, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub combination.

Although the subject matter has been described in language specific to structural features and/or logical acts, it is to be understood that the subject matter defined in the claims is not necessarily limited to the specific features or acts described above. Rather, the specific features and acts described above are merely example forms of implementing the claims.

The invention claimed is:

1. A document display method, comprising:
receiving a first browsing instruction in a first page, wherein the first page displays a first window and at least one second window, the first window displays a first document, and the second window displays a second document; and
controlling, in response to the first browsing instruction, the second window to move in a preset direction, to adjust document content displayed in a target window area of the first page, wherein the target window area is configured to display all windows other than the first window;
wherein before receiving the first browsing instruction in the first page, the method further comprises:
receiving a second browsing instruction in a second page, wherein the second page is a page configured for separately displaying the first document; and
generating the first page in response to the second browsing instruction, wherein the second window displays a document adding control, and the document adding control is used to add a second document in the second window,
wherein the document display method further comprises:
displaying the first window in a first display state, and displaying a target second window in a second display state, wherein the target second window is a second window that displays a blank second document or a first target document; and
switching the target second window from the second display state to the first display state after the target second window is displayed in the second display state for a preset period of time.

2. The method according to claim 1, wherein the controlling the second window to move in the preset direction, to adjust document content displayed in the target window area of the first page comprises:
controlling the at least one second window to move synchronously in the preset direction;
displaying a second document in the second window moved into the target window area; and
stopping displaying a second document in the second window moved out of the target window area.

3. The method according to claim 1, wherein before receiving the first browsing instruction in the first page, the method further comprises:
displaying, in response to a position locking operation for the first window, the first window in the first page, and displaying the second window in an area in the first page other than an area of the first window.

4. The method according to claim 3, wherein the displaying the first window in the first page comprises:
fixing a display position of the first window at a preset position of the first page; or
fixing a display position of the first window at a position where the first window is located when the position locking operation occurs; or
determining a fixed position based on a moving trajectory of the position locking operation, and fixing a display position of the first window at the fixed position.

5. The method according to claim 1, wherein after generating the first page, the method further comprises:
generating a blank second document in the second window in response to a trigger instruction on the document adding control; or
in response to a trigger instruction on the document adding control, generating a new second window, and generating a blank second document in the new second window; or
in response to a trigger instruction on the document adding control, acquiring a specified target document, and adding the specified target document to the second window; or
in response to a trigger instruction on the document adding control, acquiring a specified target document, generating a new second window, and adding the specified target document to the new second window.

6. The method according to claim 1, further comprising:
adjusting, in response to a first trigger operation on a maximize control of a target window displayed in the first page, a display range of the target window in the first page, to independently display, in the first page, a second target document in the target window.

7. The method according to claim 1, further comprising:
adjusting, in response to an order adjustment instruction for a third target document displayed in the first page, a display order of the third target document in the first page.

8. The method according to claim 7, further comprising:
displaying a management panel of the first page in response to a page management operation for the first page, wherein the management panel displays identification information of the first document and identification information of the second document, the identification information of the first document and the identification information of the second document are arranged according to a display order of the first document and the second document in the first page.

9. The method according to claim 8, wherein after displaying the management panel of the first page, the method further comprises:
adjusting, in response to an order adjustment operation for identification information of a third target document, an arrangement order of the identification information of the third target document in the management panel, and generating an order adjustment instruction for the third target document,
wherein the adjusting the display order of the third target document in the first page comprises:
adjusting an arrangement order of a window of the third target document in the first page according to the arrangement order of the identification information of the third target document in the management panel.

10. The method according to claim 9, wherein after the adjusting the arrangement order of the identification information of the third target document in the management panel, the method further comprises:
displaying, according to adjusted arrangement order of windows in the first page, the windows in the first page at an underlying layer of the management panel, wherein the windows in the first page comprise the first window and the second window.

11. The method according to claim 8, wherein after displaying the management panel of the first page, the method further comprises:
displaying, in a case that a focus moves to identification information of a fourth target document, the identification information of the fourth target document in a target display state, and displaying a close control corresponding to the identification information of the fourth target document; and
in response to a second trigger operation on the close control corresponding to the identification information of the fourth target document, stopping displaying the identification information of the fourth target document, and closing a window of the fourth target document.

12. An electronic device, comprising:
one or more processors; and
a memory, configured to store one or more programs, wherein
the one or more programs, when being executed by the one or more processors, cause the one or more processors to perform:
receiving a first browsing instruction in a first page, wherein the first page displays a first window and at least one second window, the first window displays a first document, and the second window displays a second document; and
controlling, in response to the first browsing instruction, the second window to move in a preset direction, to adjust document content displayed in a target window area of the first page, wherein the target window area is configured to display all windows other than the first window;
wherein before the first browsing instruction is received in the first page, the one or more processors is further caused to perform:
receiving a second browsing instruction in a second page, wherein the second page is a page configured for separately displaying the first document; and
generating the first page in response to the second browsing instruction, wherein the second window displays a document adding control, and the document adding control is used to add a second document in the second window,
wherein the one or more processors is further caused to perform:
displaying the first window in a first display state, and displaying a target second window in a second display state, wherein the target second window is a second window that displays a blank second document or a first target document; and
switching the target second window from the second display state to the first display state after the target second window is displayed in the second display state for a preset period of time.

13. A non-transitory computer-readable storage medium, comprising a computer program stored thereon, wherein the computer program, when being executed by a processor, implements:
receiving a first browsing instruction in a first page, wherein the first page displays a first window and at least one second window, the first window displays a first document, and the second window displays a second document; and
controlling, in response to the first browsing instruction, the second window to move in a preset direction, to adjust document content displayed in a target window area of the first page, wherein the target window area is configured to display all windows other than the first window;
wherein before the first browsing instruction is received in the first page, the computer program, when being executed by the processor, further implements:
receiving a second browsing instruction in a second page, wherein the second page is a page configured for separately displaying the first document; and
generating the first page in response to the second browsing instruction, wherein the second window displays a document adding control, and the document adding control is used to add a second document in the second window,
wherein the computer program, when being executed by the processor, further implements:
displaying the first window in a first display state, and displaying a target second window in a second display state, wherein the target second window is a second window that displays a blank second document or a first target document; and
switching the target second window from the second display state to the first display state after the target second window is displayed in the second display state for a preset period of time.

14. The electronic device according to claim 12, wherein the one or more processors are caused to perform:
controlling the at least one second window to move synchronously in the preset direction;
displaying a second document in the second window moved into the target window area; and
stopping displaying a second document in the second window moved out of the target window area.

15. The electronic device according to claim 12, wherein the one or more processors are caused to perform:

displaying, in response to a position locking operation for the first window, the first window in the first page, and displaying the second window in an area in the first page other than an area of the first window.

16. The electronic device according to claim 15, wherein the one or more processors are caused to perform:

fixing a display position of the first window at a preset position of the first page; or fixing a display position of the first window at a position where the first window is located when the position locking operation occurs; or determining a fixed position based on a moving trajectory of the position locking operation, and fixing a display position of the first window at the fixed position.

17. The electronic device according to claim 12, wherein the one or more processors are caused to perform:

generating a blank second document in the second window in response to a trigger instruction on the document adding control; or in response to a trigger instruction on the document adding control, generating a new second window, and generating a blank second document in the new second window; or in response to a trigger instruction on the document adding control, acquiring a specified target document, and adding the specified target document to the second window; or in response to a trigger instruction on the document adding control, acquiring a specified target document, generating a new second window, and adding the specified target document to the new second window.

\* \* \* \* \*